July 21, 1959        E. J. HAZEN        2,895,333

PRESSURE RESPONSIVE FORCE-RATIO BALANCE APPARATUS

Filed Sept. 7, 1954        2 Sheets-Sheet 1

INVENTOR.
EDWARD J. HAZEN
BY

ATTORNEY

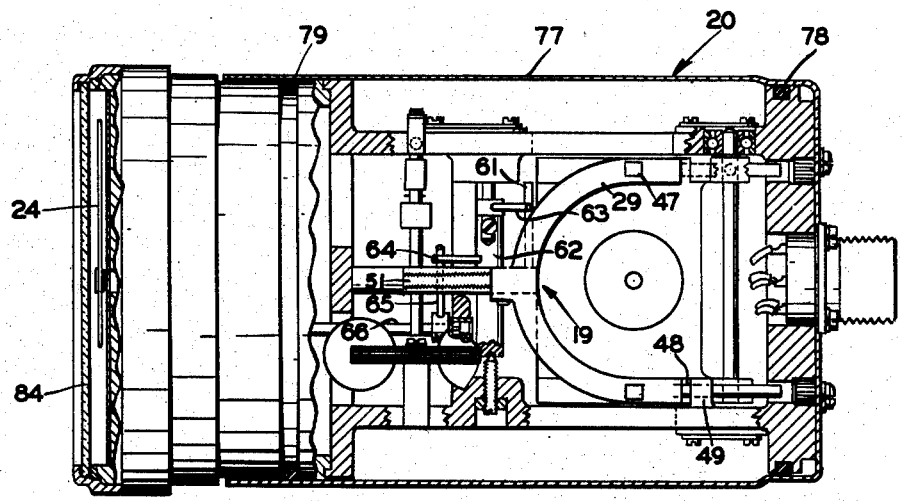
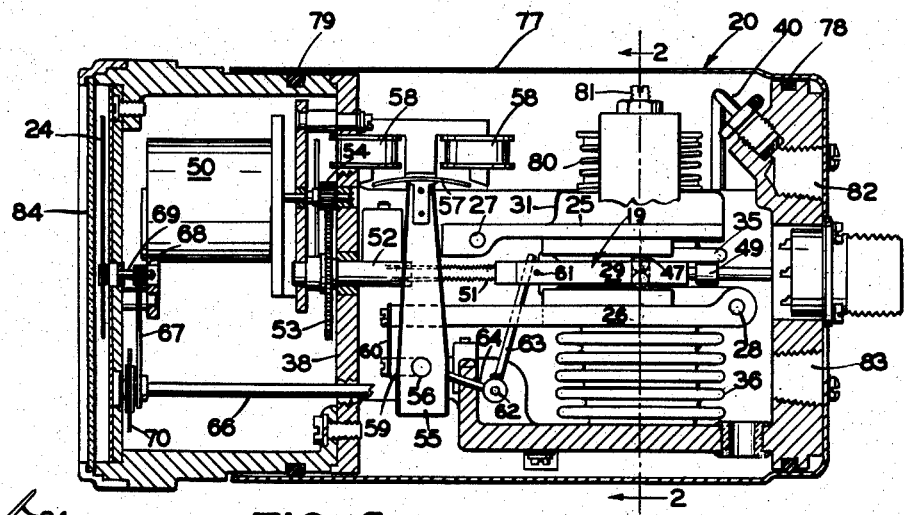
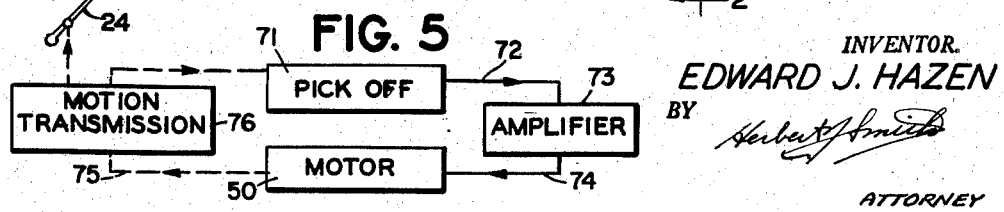

United States Patent Office 2,895,333
Patented July 21, 1959

2,895,333

PRESSURE RESPONSIVE FORCE-RATIO BALANCE APPARATUS

Edward J. Hazen, Westwood, N.J., assignor to Bendix Aviation Corporation, Teterboro, N.J., a corporation of Delaware Application September 7, 1954, Serial No. 454,277

5 Claims. (Cl. 73—182)

This invention pertains to a pressure responsive force-ratio balance device and more particularly to a pressure ratio indicating apparatus which may be used for indicating Mach number, engine pressure ratio, or other pressure ratios.

Standard equations of aerodynamics show that for any given Mach number, the ratio of total pressure ($P_t$) to static pressure ($P_s$) is equal to a constant. Also, when $P_t/P_s$ is plotted against Mach number, there is produced a smooth and continuous curve. Therefore, any mechanism which balances these two pressures through a ratio changing device could indicate Mach number by the position of the ratio changer.

The present invention is a device of the force-ratio balance type that employs a novel lever arrangement. In lieu of a simple slidable bar and lever, a yoke and wide levers having laterally spaced slidable means to facilitate longitudinal movement are employed, so that friction is reduced to a minimum. Further, since there are relatively high forces interacting on the mechanism, the spaced slidable means affords a precision mounting that has a minimum of friction and greatly lends to axial stability and increased precision of operation. Consequently, the prime mover may be of the small instrument type electric motor operative by electrical energy of low value, thereby greatly reducing the bulk and weight of the instrument.

It is an object of the present invention to provide a novel device which senses pressure ratio by means of a force-balance type sensor.

Another object of the invention is to provide a novel device for sensing pressure ratios which may be used to indicate Mach number, engine pressure ratio, or other pressure ratios.

A further object of the invention is the provision of a Mach meter of the force-balance type having a novel lever equalizing means interacting with a ratio arm.

A further object of the invention is to provide a novel device which may be used for indicating Mach number, which device senses pressure ratio directly by means of a force-balance type sensor, and wherein the sensed ratio is converted to an electrical signal and reconverted to a mechanical motion which is transmitted to an indicator.

A further object of the invention is to provide a novel device of the kind set forth that is simple in construction, positive in operation and extremely robust.

This invention contemplates a device that may be used for indicating Mach number. A pair of bellows or aneroids are independently responsive to total and static pressures and interact on a pair of double track levers and a yoke-type ratio arm in a force-balance type arrangement.

As the Mach number varies, the levers are unbalanced and simultaneously the vane of an E pick-off moves from its null position and unbalances the electrical zero of a circuit connected through an amplifier to a reversible motor. Depending upon the phase and amplitude of the signal, the motor moves the yoke of the ratio arm in a direction to again balance the forces exerted on the levers by the bellows. The travel of the ratio arm is a function of Mach number. A simple lever and gear arrangement transfers the ratio arm and yoke motion to the Mach number indicator pointer. The lever arrangement and associated parts may have other uses, for example, an engine pressure ratio indicating system.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

Fig. 3 is a top view of the apparatus with a portion approximately above the yoke shown in section, and with certain of the pointer mechanism and motor arrangement omitted.

Fig. 4 is a side view of the device with certain parts in vertical cross section including the casing.

Fig. 5 is a schematic diagram showing a representative electrical circuit in relation to the motion transmission and dial pointer.

Figure 1:
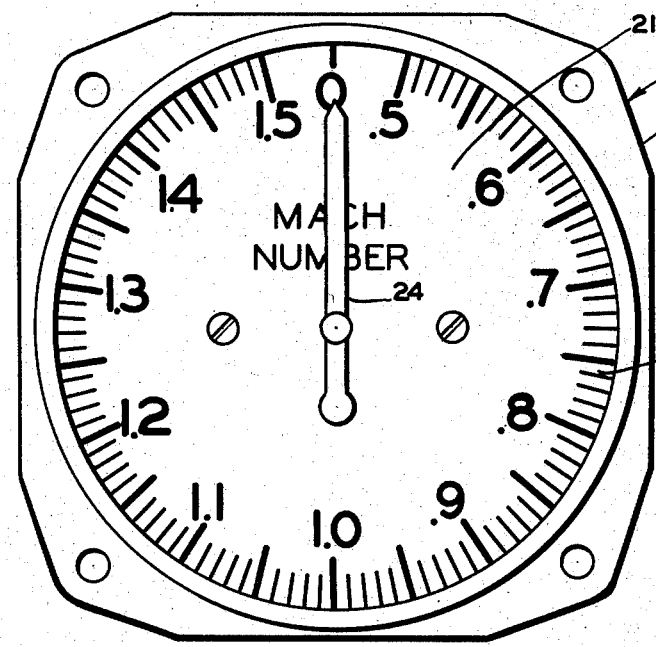
Fig. 1 is a front view of a representative Mach meter.
Figure 2:
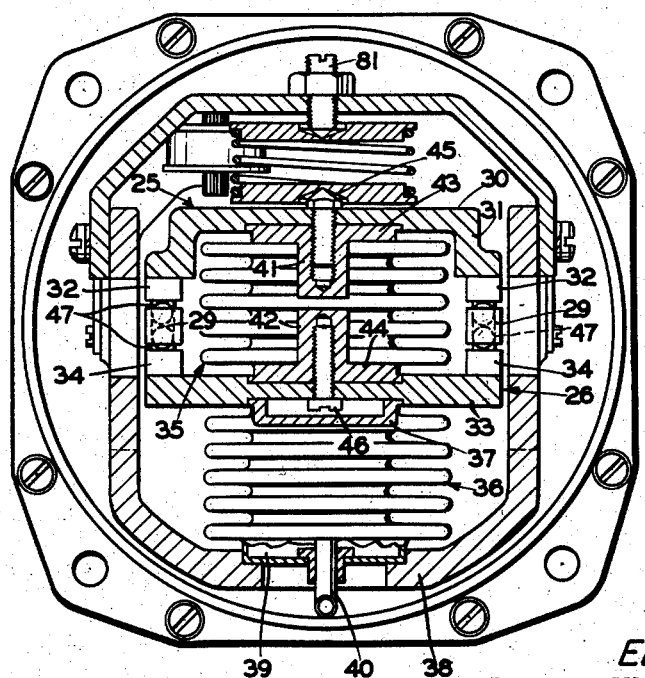
Fig. 2 is a vertical sectional view taken substantially along lines 2—2 of Fig. 4, with a portion of the mechanism supporting structure added.

Referring to the drawings and more particularly to Fig. 1, there is shown a device representative of the invention in the form of a Mach meter 20 having a transparent window 21 which is secured to a casing 22, while a dial 23, graduated in Mach number, is positioned within the casing so that a pointer 24, which is concentrically mounted relative to the dial, may be moved in response to normal operation of the device.

A pair of levers comprising an upper lever 25 and a lower lever 26 are pivotedly mounted on an upper lever shaft 27 and a lower lever shaft 28, respectively, with a ratio arm 19 including a yoke 29 movable therebetween, whereby forces resulting from static and total or impact pressures at an aircraft Pitot tube are balanced by means of the ratio arm which continuously changes the mechanical contact position of caged rollers accordingly, between the levers to maintain the balanced condition and indicate the resultant Mach number.

The upper lever 25 is substantially U-shaped in a vertical cross section thereof, having an upper portion 30 connected with a pair of spaced side portions 31, each of said side portions having a track 32 secured thereon.

The lower lever 26 has a plate portion 33 with a pair of tracks 34 secured thereon or formed integral therewith, in spaced relation from one another, with said tracks being vertically spaced from and positioned below the upper lever tracks 32, and with the yoke 29 of the ratio arm 19 being movable therebetween.

An evacuated bellows 35 subject to static fluid pressure ($P_s$) applied within the casing 22 has one end thereof secured to the upper portion 30 of the upper lever 25, while the lower end of said evacuated bellows is secured to the top of the plate portion 33 of the lower lever 26.

Another bellows or aneroid 36 responsive to impact or total fluid pressure ($P_t$) applied to the interior surface thereof from a Pitot tube of conventional type has one end of the bellows 36 secured to the bottom of the plate portion 33 by means of a mounting plate 37, while the lower end of said bellows 36 is secured to a frame 38, which is part of an overall supporting structure secured within the casing 22, said lower end of the bellows 36 being secured to the supporting structure via a mounting plate 39 which may be adjustable.

A tube 40 has one end thereof communicating with the bellows 36 interior thereof, while the opposite end of said tube 40 is connected to an outlet in the casing 22 for ultimate connection to impact pressure from an aircraft Pitot tube of any suitable or conventional type. Since the partially evacuated bellows 35 would have a tendency to be drawn together under the static pressure applied to the exterior surface thereof, conventional limiting means, such as 41 and 42, form part of the mounting plates 43 and 44, respectively. The evacuated bellows mounting plates and the mounting plates 37 and 39 of the aneroid or bellows 36 may have one or both ends thereof with adjustable means for applying the proper amount of tension to their respective bellows 35 and 36. Bellows mounting screws 45 and 46 are threadedly connected through the upper and lower levers to the limiting means 41 and 42.

The yoke 29 is U-shaped and generally follows the horizontal cross sectional contour of the evacuated bellows 35. Rollers 47 are carried in arm portions of the yoke 29 in suitable cages so arranged that the rollers 47 are confined from longitudinal movement relative to the arm portions of the yoke 29 while perpendicularly movable in the arm portions of the yoke 29 upon an unbalance in the forces applied to the rollers 47 by the levers 25 and 26. The arrangement is such that the yoke 29 and its caged rollers 47 may be suitably positioned to provide spaced movable riding surfaces between the tracks of the upper lever 25 and the lower lever 26 by means of the caged rollers 47 which are rotatably carried in the yoke 29 and arranged so as to transmit an unbalance in the forces applied at one to the other of the levers 25 and 26 at opposite sides of the U-shaped yoke portion 29 of the ratio arm 19.

The free ends of the arm portions of the yoke 29 have secured thereto guide pins 48 which are disposed in the same horizontal plane as the yoke, so that the ends may have a sliding fit in journal portions 49 of the supporting structure. In operation, the guide pins 48 will slide in and out of the journal portions as the yoke is moved longitudinally in response to operation of the motor 50. The yoke 29 of the ratio arm 19 has a lead screw 51 with one end thereof secured thereto, with the opposite end of a lead screw being threadedly connected with a threaded hub 52 formed integral with a hub gear 53, which gear is journaled in the frame 38.

A motor pinion 54 is secured to the shaft of the motor and is in engagement at all times with the hub gear 53, so that operation of the motor in either one direction or the other, depending on the phase of the electric signal from a pick-off device, will cause the motor pinion 54 to rotate the hub gear and its threaded hub 52, so that the lead screw 51 of the ratio arm 19 will be moved axially, and thereby cause longitudinal movement of the yoke 29 to balance the levers and cause the indicator pointer to be moved accordingly.

The caged rollers 47 are positioned within the yoke 29 and mounted for rotational movement therein. The outer surfaces of said caged rollers will engage the riding surfaces of the tracks 32 and 34 of the upper and lower levers 25 and 26 respectively, so that as pressures applied to the levers 25 and 26 are varied and applied through said caged rollers 47 from one lever to the other lever, the ultimate rotation of the motor 50, via the pick-off circuit, will cause movement of the ratio arm 19 thereby bringing the levers 25 and 26 again into balance, whereby the E pick-off will be restored to its null position, and the absence of a signal will thereby stop the motor 50.

The pick-off arm 55 is pivotably mounted on a shaft 56 and has a vane 57 or movable armature of magnetizable material positioned in front of the poles of the pick-off coils 58.

A stud 59 is secured to the pick-off arm shaft 56 in a position normal thereto. A link 60 secured to the free end of the lower lever 26 is connected with the pick-off arm stud 59 so that as the lower lever 26 becomes unbalanced the pick-off arm 55 will be rotated on its shaft 56 to move the vane 57 from its electrical equilibrium position on null to actuate the motor 50 for restoration of the pick-off arm 55 and vane 57 to null position.

Concerning movement of the Mach meter pointer 24, the yoke 29 has a yoke pin 61 secured thereto and extending laterally in the same plane as the yoke. A rock shaft 62 has pins 63 and 64 secured thereto. The rock shaft pins are disposed normal to the axis of the rock shaft with said pins being angularly displaced relative to each other. The pin 63 is in contact with the yoke pin 61, while the pin 64 is in contact with the sector shaft pin 65 which is secured to a sector shaft 66 at one end thereof. Movement of the sector shaft pin 65 will cause rotational movement of the sector shaft which has a sector 67 secured adjacent the opposite end of the sector shaft. The sector shaft is journaled in the supporting structure of the device.

The toothed end of the sector 67 engages a dial pinion 68 which has a dial pinion shaft 69 secured thereto, with the pointer 24 being secured on said dial shaft. It will be seen that as the ratio arm 19 and its yoke is moved laterally upon rotation of the motor, the yoke pin 61 will engage the pin 63 thereby causing movement of the rock shaft 62. The rock shaft causes movement of the pin 64 which engages the sector shaft pin 65 (Fig. 3). The sector shaft pin will cause rotation of the sector shaft, and the motion of the sector 67 will thereby rotate the dial pinion, the dial shaft, and the pointer 24.

A bias spring 70 is secured on the sector shaft 66 to keep the various pins in movable contact with one another so that the backlash in the gear and lever arrangement is restricted in a conventional manner.

The block diagram in Fig. 5 shows the pick-off 71 having a solid line connection 72 to the input of an amplifier 73. The pick-off may be of a conventional type having a pair of coils that cooperate with an armature movable in the magnetic field of the coils to cause an unbalance of the electrical circuit. The output of the amplifier 73 is connected to the motor 50 via suitable conducting means 74. The output of the motor has a mechanical connection 75 connected to a motion transmission 76. The pick-off 71 also has a mechanical connection to the motion transmission 76. A mechanical connection is shown connecting the motion transmission 76 with the pointer 24 of the Mach meter.

While any number of type pick-off devices, such as potentiometers or indicating devices may be used, a conventional E type pick-off 71 is disclosed in the present embodiment. In a well known manner, a displacement of the pick-off armature or vane 57 from its normal null or center position develops a signal corresponding in phase and amplitude to the direction and extent of relative displacement of the vane 57 from null. The signal being of a low level is amplified in a conventional amplifier 73 to drive a conventional inductive motor 50 by energizing the variable phase windings of the motor to rotate the motor 50 in a clockwise or counter-clockwise direction depending upon the phase of the signal received from the pick-off 71.

A helical spring 80 is shown positioned between the upper lever 25 and a portion of the supporting structure and has an adjustment screw 81 mounted in the supporting structure to tension the spring. However, the spring may or may not be used since the bellows may be adjusted and tensioned to provide adequate interaction between the levers.

The Mach meter 20 has a casing shell portion 77 which slides over substantially the entire mechanism and is sealed relative thereto by resilient friction means such as rubber rings 78 and 79.

The opening 82 is actually an opening for a pipe thread for connection of the tube 40 from the interior of the bellows 36 with the impact pressure from a suitable Pitot tube carried by the aircraft. The opening 83 is a port for application of static pressure within the casing of the instrument 20 and may lead from the static pressure connection of the Pitot tube.

The device is hermetically sealed in a well known manner and includes the transparent window 84 positioned in front of the dial and dial pointer and secured in a conventional manner.

From the foregoing, it will be seen that the lever arrangement provides a pair of levers that are spaced from one another, each of which has a pair of flat surfaces in the same plane spaced from one another. A ratio arm having a yoke portion, which may be substantially U-shaped, is adapted to at least partially embrace one of the bellows. By spacing the sets of caged rollers which are rotatably mounted in the yoke, and with the free ends of the yoke being longitudinally slidable in the supporting structure, the ratio arm has the desired axial stability. With this stability, the rotation of the threaded hub mounted on the lead screw portion of the ratio arm has practically no measurable rotational effect on the yoke.

The evacuated bellows 35 has static fluid pressure ($P_s$) applied to the exterior surfaces thereof which tends to collapse the bellows 35 and in turn bias the levers 25 and 26 with their respective track surfaces 32 and 34 into contacting relation with opposite end rollers of the force transmitting means 47 carried by the yoke 29 slidably positioned between the track surfaces 32 and 34. Thus the static fluid pressure applied to the exterior surfaces of the bellows 35 tends to maintain the levers 25 and 26 in contacting relation with the rollers 47.

In addition, the bellows 35 and 36 are so arranged in relation to the levers 25 and 26 as to provide (1) a force on lever 25 proportional to the static pressure ($P_s$) and (2) a force in an opposite direction on lever 26 proportional to the impact pressure ($P_t$).

The foregoing is accomplished by establishing an area corresponding to the surface areas of end plates 43 and 44 within the evacuated bellows 35 to which there is applied a substantially zero pressure effective at one side of the lever 25 and at one side of the lever 26. Further a surface area on the opposite side of the lever 25 from that of the end plate 43 of the bellows 25 is exposed to static pressure ($P_s$) applied within casing 22 and exteriorly of the bellows 35 so as to apply to the lever 25 a force proportional to the static pressure ($P_s$), while a surface area within the bellows 36 corresponding to the area of the end plate 37 of the bellows 36 adjacent the lever 26 is exposed to the impact pressure ($P_t$) applied within the bellows 36 so as to apply to the lever 26 a force proportional to the impact pressure ($P_t$).

The end plate 37 of the bellows 36 and the end plate 44 of the bellows 35 are secured at opposite sides of the lever 26 so that the effective operative impact pressure ($P_t$) applied within the bellows 36 to the inner end surface 37 thereof adjacent one side of lever 26 is opposed by the substantially zero pressure applied to the inner end surface 44 of the evacuated bellows 35 adjacent the opposite side of lever 26. Moreover, the effective operative static pressure ($P_s$) applied at one side of lever 25 and to a surface area thereof corresponding to the area of plate 43 of the bellows 35 adjacent the lever 25 is likewise opposed by the substantially zero pressure applied at the opposite side of the lever 25 to the inner end surface 43 of the evacuated bellows 35 adjacent the lever 25.

The effective operative pressures ($P_s$) and ($P_t$) as thus applied effect a pressure difference across the known areas of plates 43 and 37 which results in a force being applied to each lever 25 and 26 proportional to the applied pressures.

These forces acting in an opposing sense on levers 25 and 26 are transmitted from one lever to the other lever through the force transmitting means or caged rollers 47. The caged rollers 47 may be moved by adjustment of the yoke 29 between the pivot point 27 at one end of the lever 25 and the pivot point 28 at the opposite end of the lever 26 so as to change in opposite senses the leverage through which the forces act on the levers 25 and 26 so that by suitable adjustment of the yoke 29 a balance point may be reached at which the impact pressure ($P_t$) force applied through lever arm 26 exactly equals the static pressure ($P_s$) force applied through lever arm 25.

While the force ratio balance presented herein is specifically shown relative to a Mach meter, it is to be understood that the same basic motion transmission may be employed in conjunction with a suitable temperature transducer and computer mechanism to indicate true airspeed.

Obviously, the same basic motion transmission including the lever arrangement and ratio arm may be used as an indicating system for determining the pressure ratio of engines. Concerning the latter, an engine pressure ratio indicating system may indicate the ratio of engine turbine exhaust total pressure to engine inlet total pressure. Therefore, the indicated ratio would provide a parameter of engine performance which can be used in determining a take-off thrust and cruise control. In the particular system for engines the pressure ratio transducer receives engine turbine exhaust total pressure from a pressure rake mounted in the turbine exhaust and engine inlet total pressure from a Pitot head mounted on a strut in the engine inlet duct. Pressure ratio is computed in the transducer and transmitted synchronously to the cockpit mounted indicator.

As many changes could be made in the above construction and many apparently widely different embodiments of this invention could be made without departing from the scope thereof, it is intended that all matters contained in the above description or shown in the accompanying drawings shall be interpreted as illustrations and not in a limiting sense.

What is claimed is:

1. In a Mach meter, the combination comprising a pair of bellows responsive to, respectively, impact and static pressures, a force ratio balance mechanism including a pair of levers pivoted on spaced parallel axes and responsive to changes in said bellows pressures, with one of said bellows having an end fixedly mounted and another end bearing upon one of said levers, means for supplying a fluid medium under said impact pressure to an interior surface of said one bellows so as to apply a force to said one lever varying with said impact pressure, another of said bellows being at least partially evacuated and disposed between and having opposite ends connected to both of said levers, each of said levers having portions extending between said axes providing spaced and generally parallel track surfaces with one track surface of each lever being disposed at one side of said other bellows and the other track surface of each lever being disposed at the opposite side of said other bellows, means for supplying a fluid medium under static pressure to an exterior surface of said other bellows and so as to apply a force to the other of said levers varying with said static pressure and in a sense opposite to the force applied to said one lever by the impact pressure, longitudinally slidable force transmitting means including caged roller members having surfaces simultaneously bearing on the track surfaces of both levers and movable perpendicular relative to said slidable means upon an unbalance in the forces applied through said levers, electrical pick-off means for generating a continuous signal and having a control element normally in a null position and movable therefrom upon the unbalance in said forces, linkage means for operatively connecting at least one of the pressure responsive levers to the control element of the pick-off means, motor means coupled to said slidable means and responsive to the phase and amplitude of the generated signal to actuate the slidable means in a sense to vary the leverage of said levers in opposite senses so as to rebalance the forces applied through said levers to restore the control element of the pick-off means to the null position, and indicating means drivingly connected to said slidable means for indicating Mach number.

2. In a pressure sensing indicating device; the combination comprising a pair of pressure sensitive devices independently responsive to different pressures, a force-ratio balance mechanism including a pair of levers pivoted on spaced parallel axes and responsive to changes in said pressures, one of said devices being disposed between and operatively connected to both of said levers, the other of said devices being connected between one of said levers and a point fixed relative to said axes, each of said levers having portions extending between said axes providing spaced and generally parallel track surfaces, slidable means including members carried by said slidable means and having surfaces simultaneously engageable with the track surfaces of both levers to operatively connect said levers, electrical pick-off means for generating a continuous signal and having a control element normally in a null position and movable therefrom, means for operatively connecting one of said levers to the control element of the pick-off means, motor means coupled to said slidable means and responsive to the phase and amplitude of the generated signal to actuate the slidable means accordingly and restore said levers to a balanced relation and thereby the control element of the pick-off means to null position, and indicating means operatively connected to said slidable means for indicating a function of the pressure ratios.

3. In a pressure ratio indicating system; a mechanism comprising two pressure responsive devices connectable to independent sources of fluid pressures, a pair of levers pivoted on spaced parallel axes and connected to and responsive to actuation of each of said devices and with one of said devices being disposed between and connected to both of said levers, each of said levers having portions extending between said axes providing spaced and generally parallel track surfaces, a slidable ratio-arm including force transmitting means for simultaneously bearing on both of said levers along said track surfaces, signal generating means including a control element operably connected to one of the levers and movable therewith from a balanced reference position for developing a signal, motor means responsive to said signal in sense and magnitude and operatively connected to said slidable ratio-arm to adjust the force transmitting means and thereby said levers for re-establishing said control element in said balanced reference position, and indicating means responsive to movement of said ratio arm to indicate a function of the ratio of said fluid pressures.

4. A pressure ratio indicating system as set forth in claim 3 wherein one pivotably mounted lever has a pair of track surfaces positioned substantially opposite a pair of track surfaces provided on the other of said pivotably mounted levers, and said force transmitting means includes caged roller members carried by said ratio-arm in such a manner as to simultaneously bear on the track surfaces of both of said levers so as to transmit force from one to the other.

5. For use in a pressure ratio indicating system; a mechanism comprising a casing, a supporting member mounted within said casing, a first lever, means pivotally connecting an end of the first lever to the supporting member, a second lever, other means pivotally connecting an end of the second lever to the supporting member, each of said first and second levers being pivoted by said first and second-mentioned means on spaced parallel axes, each of said levers having portions extending between said axes providing a pair of spaced and generally parallel track surfaces, the pair of surfaces of one lever extending in normally parallel spaced relation to the pair of surfaces of the other lever, a ratio-arm slidably mounted in the supporting member, said ratio-arm including a U-shaped yoke having arm portions longitudinally adjustable between the pair of surfaces of the first lever and the pair of surfaces of the second lever, rollers carried by each of the arm portions, said rollers having surfaces bearing simultaneously upon the surfaces of said levers, said rollers being confined in said arm portions from longitudinal movement relative to said arm portions and said rollers being movable perpendicular relative to said arm portions upon an unbalance in force applied to the roller surfaces bearing on the surfaces of said levers, a pair of fluid pressure sensitive bellows positioned within said casing, one of said fluid pressure sensitive bellows being partially evacuated and disposed between and operatively connected to both of said levers intermediate the ends of the levers, said first lever having a surface area subject to fluid pressure within said casing and cooperating with said one bellows to apply a force to said first lever proportional to said last-mentioned fluid pressure, the other of said fluid pressure sensitive bellows being subject to another fluid pressure applied to an interior surface of said other bellows, said other bellows being affixed at one end to said supporting member and operatively connected at the other end to said second lever intermediate the ends of the second lever so as to apply a force thereto proportional to said other fluid pressure, spring means affixed at one end to said supporting member and operatively connected at the other end to said first lever intermediate the ends of the first lever, said pair of bellows cooperating with said first and second levers to effect through said rollers movement of said first and second levers relative to said ratio arm upon a change in the aforesaid fluid pressures, an electrical pick-off device carried by said supporting member for generating an electrical signal, said device including a control element operably connected to one of the levers and movable therewith from a normally balanced reference position to a signal developing position, motor means carried by said supporting member and electrically controlled by said signal generating device, means mechanically coupling said motor means to said slidable ratio arm for moving said ratio arm so as to cause adjustment of said rollers relative to said levers and ratio arm in such a manner as to vary the leverage of said levers in opposite senses and re-establish the control element of the pick-off device to the normally balanced reference position, and indicating means operatively connected to said ratio arm for indicating a function of the ratio of the fluid pressures.

References Cited in the file of this patent

UNITED STATES PATENTS

| 2,508,623 | Schaefer | May 23, 1950 |
| 2,598,681 | Garbarini | June 3, 1952 |
| 2,599,288 | Schaefer | June 3, 1952 |
| 2,694,927 | Coulbourn | Nov. 23, 1954 |

FOREIGN PATENTS

| 575,008 | Great Britain | Jan. 30, 1946 |